United States Patent
Fieldman

(10) Patent No.: US 11,792,357 B1
(45) Date of Patent: Oct. 17, 2023

(54) ANTI-CHEATING METHODS IN AN EXTENDED REALITY ENVIRONMENT

(71) Applicant: VR-EDU, Inc., Gainesville, FL (US)

(72) Inventor: Ethan Fieldman, Gainesville, FL (US)

(73) Assignee: VR-EDU, INC., Gainesville, FL (US)

( * ) Notice: Subject to any disclaimer, the term of this patent is extended or adjusted under 35 U.S.C. 154(b) by 0 days.

(21) Appl. No.: 18/057,788

(22) Filed: Nov. 22, 2022

(51) Int. Cl.
| | |
|---|---|
| *H04N 5/76* | (2006.01) |
| *G06F 3/14* | (2006.01) |
| *G02B 30/22* | (2020.01) |
| *G06T 19/20* | (2011.01) |
| *G06T 15/00* | (2011.01) |

(52) U.S. Cl.
CPC .............. *H04N 5/76* (2013.01); *G06F 3/14* (2013.01)

(58) Field of Classification Search
CPC .. H04N 5/76; G06F 3/14; G02B 30/22; G06T 19/20; G06T 15/00
USPC ............. 348/42, 51, 53, 47, 48, 14.1, 61, 78
See application file for complete search history.

(56) References Cited

U.S. PATENT DOCUMENTS

| | | | |
|---|---|---|---|
| 10,706,011 B2 | 7/2020 | Leinberg et al. | |
| 10,769,571 B2 | 9/2020 | Anderson et al. | |
| 10,885,802 B2 * | 1/2021 | Gleim | G09B 7/00 |
| 2002/0163532 A1 * | 11/2002 | Thomas | G11B 27/105 |
| 2015/0332595 A1 | 11/2015 | Shakir | |
| 2016/0055490 A1 | 2/2016 | Keren et al. | |
| 2019/0311187 A1 | 10/2019 | Gleim et al. | |
| 2020/0118456 A1 * | 4/2020 | Breed | G06F 3/167 |
| 2020/0175885 A1 * | 6/2020 | Lelo | G09B 7/00 |
| 2022/0101744 A1 | 3/2022 | Gleim et al. | |
| 2023/0034773 A1 * | 2/2023 | Wang | G06F 3/14 |

* cited by examiner

*Primary Examiner* — Daquan Zhao
(74) *Attorney, Agent, or Firm* — POLSINELLI PC

(57) ABSTRACT

A method to detect cheating on an examination in an extended reality environment, such as by a user taking an examination via a virtual reality headset, includes detecting an activity of the user during the examination that triggers a notification of possible cheating by the user to an individual monitoring for cheating and displaying the user taking the examination in the extended reality environment to the individual monitoring for cheating on a display of computing hardware, such as via another virtual reality headset, mobile computing device, or computer device connected to an online network.

20 Claims, No Drawings

ANTI-CHEATING METHODS IN AN EXTENDED REALITY ENVIRONMENT

BACKGROUND OF THE INVENTION

Extended reality (XR) environments, including virtual reality (VR) that replaces a user's environment with an immersive computer-generated virtual environment, augmented reality (AR) which supplements a user's real world view by overlaying computer-generated information, and mixed reality (MR) that provides a hybrid reality environment that merges real and virtual environments with physical and digital objects co-existing and interacting in real time, have grown more realistic and immersive as XR headsets and hardware interfaces, processor speeds, data storage and data transfer technologies have continued to improve. However, unlike conventional physical reality (i.e., real world), electronic XR environments present more opportunities for persons to learn, collaborate and share information, including in work and education fields, in ways that are not possible in the physical constraints of the real world.

One of the challenges to taking advantage of these opportunities is combining two-dimensional (2D) and three-dimensional (3D) displays of virtual objects and information to enable users to see, use, interact, store and manage collaborative activities, information, other users and the virtual objects optimally in the XR environment, such as a VR world. Another challenge to working and learning in VR environments is adapting a user's real-world physical positions and motions to provide information inputs and corresponding VR experiences and VR views in the virtual reality world, particularly when multiple users occupy a common space in VR and have different viewing angles and perspectives with respect objects displayed in the space in the virtual reality world. A variety of these XR challenges and systems and methods for solving the same are described in applicant's U.S. patent publication no. US2022/0139056 that is incorporated herein by reference.

In particular, XR environments are increasingly being used in education for teaching, evaluation and assessment, tutoring, quiz and test examinations and like educational experiences in both work and school-related fields.

One specific area of need for improving educational experiences in XR environments is deterring and monitoring individuals, such as students and other persons taking examinations, from cheating during an examination experience. Unfortunately, cheating in the real world, including during online examinations, is a widespread issue. XR environments may offer improved examination experiences in terms of mimicking real world testing conditions while providing the ability for test givers to better monitor and restrict a virtual testing environment, but the risks of cheating in such environments is not eliminated. Inventions described herein provide improved anti-cheating systems and methods adapted for XR examination and educational environments.

SUMMARY OF THE INVENTION

Embodiments of the invention address cheating challenges by providing methods and systems to assist in preventing and catching cheating during examination of users (such as for tests and quizzes), including scholastic, tutoring, work, and other educational activities, in an XR environment, and preferably a VR environment, but also including AR and MR environments. In embodiments, methods and systems of the invention are implemented through development tools for the Meta Quest Pro platform (Oculus Platform SDK or "Oculus SDK") by Oculus VR(Irvine, CA) (parent company Meta). It will be appreciated that the systems and methods, including related displays, user interfaces, controls and functionalities, disclosed herein may be similarly implemented on other VR platforms with other VR SDKs and software development tools known to VR developers, such as Meta's Prescence Platform for development of MR environments.

In one embodiment, a method of the invention includes detecting cheating on an examination in an extended reality environment by displaying one or more examination questions to a user in the extended reality environment that is wearing user extended reality hardware, e.g. VR headset, detecting an activity of the user during the examination that triggers a notification of possible cheating by the user to an individual monitoring for cheating, and displaying the user taking the examination in the extended reality environment to the individual monitoring for cheating on a display of computing hardware.

In some embodiments, the displaying the user taking the examination in the extended reality environment to the individual monitoring for cheating occurs as an extended reality video recording after the user has finished taking the examination.

In other embodiments, the displaying the user taking the examination in the extended reality environment to the individual monitoring for cheating occurs while the user is still taking the examination, including real-time or near real-time display of the user during XR examination.

In one embodiment, the individual monitoring for cheating is kept invisible to the user during displaying the user taking the examination in the extended reality environment to the individual monitoring for cheating.

In another embodiment, the individual monitoring for cheating is made visible to the user during displaying the user taking the examination in the extended reality environment to the individual monitoring for cheating.

In certain embodiments, the user suspected of cheating is provided notification that they are being monitored, i.e., watched by the individual monitoring for cheating, following trigger of the notification of possible cheating.

In various embodiments, the display of computing hardware is a display of a second wearable extended reality hardware of the individual monitoring for cheating, including a virtual reality headset is some embodiments. In other embodiments, the display of computing hardware is a display of a mobile computing device or of computing device display connected to an online network.

In preferred embodiments, the user wearable extended reality hardware is a virtual reality headset.

In some embodiments, activities of a user indicating possible cheating are recorded as XR video and bookmarked, or similarly flagged, to enable quick retrieval of the video recording to the individual monitoring for cheating after being notified of the possible cheating activity. In further embodiments, multiple XR videos may be recorded of one or more users engaged in possible cheating activities and the multiple videos are bookmarked for retrieval and viewing by one or more individual monitoring for cheating.

In preferred embodiments, a plurality of users are simultaneously being monitored for cheating that are taking the same examination in an extended reality environment.

In various embodiments, methods of the invention include tracking and comparing usage of one or more extended reality tools used for the examination by the plurality of users for at least one question of the examination and providing the notification of possible cheating when a user's individual usage of the one or more extended reality tools is different by a predetermined amount from an average usage of the one or more extended reality tools by the plurality of users for the at least one question.

In further embodiments, the one or more extended reality tools are provided to each of the plurality of users for use from a respective virtual tablet displayed to each of the plurality of users during the examination in the extended reality environment.

DETAILED DESCRIPTION OF THE INVENTION

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on. Devices implementing methods according to these disclosures can comprise hardware, firmware and/or software, and can take any of a variety of form factors. Typical examples of such form factors include servers, laptops, smartphones, small form factor personal computers, tablets, personal digital assistants, XR headsets, including VR headsets, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

In embodiments, methods and systems of the invention are implemented through development tools for the Meta Quest Pro platform (Oculus Platform SDK or "Oculus SDK") by Oculus VR(Irvine, CA) (parent company Meta). It will be appreciated that the systems and methods, including related displays, user interfaces, controls and functionalities, disclosed herein may be similarly implemented on other VR platforms with other VR SDKs and software development tools known to VR developers, such as Meta's Prescence Platform for development of MR environments. In various described embodiments a Meta Quest Pro headset may be used in combination with application software developed for the Meta Quest Pro platform to implement inventions described herein.

In one embodiment, cheating detection software in an XR environment, including VR examination experiences, maintains an examinee (test taker) in the testing application where the examination, including tests, quizzes and the like, is being given to the user in the XR platform. For example, an XR education application is preferably running on the XR platform and provides an extended reality environment for the examination experience. During the examination, a user is "locked" into the application during the timeframe of the examination. The user is restricted from accessing other designated applications and files, such as browsers, notes, games, calculators, reference materials, media and the like, while the examination timeframe is occurring. It will be appreciated that such restrictions will keep the user from accessing potentially disallowed applications and files and assist in preventing cheating by misuse of such materials during the examination since the same cannot be accessed outside of the application rendering the examination to the user. In some embodiments, restrictions may be controlled on question-by-question basis so that certain tools, applications, or files are accessible when a user is answering a particular question, but then controls can be changed to restrict or allow different access to certain tools, applications or files when a different question is presented for a user to answer.

It will be appreciated that detection of movement of the XR hardware both deters users from attempting to cheat by maintaining focus within the XR hardware and the application rendering the examination.

In some embodiments, test givers could require all test takers to stay in the XR platform, such as keeping on the wearable XR hardware, e.g. VR headset, for the entire examination timeframe—whether or not the test taker finished early. Unlike in real world examination rooms where test takers typically may leave the room when finished with the test, test takers (regardless of where in the world they are) during the same examination time frame could be required not to remove the XR hardware and/or leave until the complete examination window has finished. In some embodiments, an XR examination application may permit an early finisher who indicates they have finished the examination but who has time remaining to keep on a headset until the window is completed to access certain applications or in-app activities like games, movies, media, and the like until the predetermined timeframe is completed for all test takers. Such restrictions from removing XR hardware would help prevent early finishers from potentially contacting other users still taking the examination during the timeframe and reduce the potential for cheating—but providing limited access to entertaining activities during the remainder of the examination timeframe would keep the individual from becoming bored until the end of the test.

In certain embodiments, cheating allegations can also be investigated with more transparency and more particular XR evidence being available based on recording of the experience and the saving of data as to what tools, files, notes, calculator inputs, VR scratch paper and the like that a user was accessing at particular times during an examination. Specifically, a test taker can watch or re-watch their own video of an examination experience and show that they were not actually cheating by the activities that they were engaged in and what they were accessing when. Conversely, a test giver can also watch or re-watch the video of a test taker and determine if any cheating was engaged in from the recorded XR video of the examination experience and what was being accessed when in the XR environment. It will be appreciated, that when such video recordings are watch and re-watched on in XR platform, the video will provide a 3D experience with more details being watchable as to the test taker (expressions, eye position and the like) and objects in the environment (notes, tools, calculator presses, and the like).

In further embodiments, a detection application or system module in the XR environment during an examination experience can monitor for predetermined sounds indicative of potential cheating through microphones on or in wearable XR hardware. For example, if an individual is verbally reading out loud some of or the whole test (e.g. detecting words from the test questions), which could signal unauthorized recording or sharing the test with another individual in the real world who is scheduled to later take the test, sound detection could provide notification to test givers and/or test takers of the potential cheating activity. In other embodiments, the XR hardware can monitor for specific answer words being said out loud, which may indicate that another user is in the real world near the test taker and attempting to assist in cheating.

In some embodiments, a camera or plurality of camera of the wearable XR hardware can monitor a user's arms and/or hands for comparison to expected positioning of a test taker's arms and/or hands during an examination. For example, if arms or hands are detected to be coming from an unexpected position below a headset or above a headset rather than from a user's expected side positions, then the detecting software may provide a notification to a test giver and/or warning to the test take of possible cheating—such as the possibility an outside user's arms or hands are being detected as entering the XR examination environment. Similarly expected race, gender, body size, birthmarks, tattoos, fingernail polish and the like could be used to verify that a test taker's hands or arms are consistent with the expected physical characteristics of the test taker and do not indicate possible cheating by someone else taking a test for the expected test taker. If the physical characteristics do not match the expected characteristics of the user then a notification and/or warning could be provided by detection software to one or both of the test giver and test taker.

In certain embodiments, monitoring of a test taker's arms and/or hands occurs in combination with monitoring with a user's eyes. It will be appreciated that singularly monitoring only a user's eyes or only a user's hands/arms may not provide sufficient indication of the likelihood that a user is attempting to cheat. Instead, the combination of a user looking in a particular unexpected direction, such as down and not straight into a VR headset (or other XR hardware) for answering examination questions, and also with simultaneous detection of hands moving or holding something in an unexpected manner—such as not writing or using a an XR calculator as might be expected for a particular question of the examination—will both together indicate a strong likelihood of cheating.

In some embodiments, cameras, light detection sensors and/or machine vision may be used in connection with wearable XR hardware, such as a VR headset, to detect if a user has modified the hardware to engage in potential cheating. For example, if a hole is cut into the XR hardware to allow seeing outside the hardware to a cheat sheet or assistance of an accomplice, a camera or similar detector could "see" the hole or detect increased light beyond an expected level and report the modification to a test taker. In further embodiments, a user could be requested to use an external camera device, such as a mobile phone, webcam, or other computing device with a camera, to take and send/upload a picture of the user with the XR hardware before an examination to confirm that the XR hardware is properly intact and has not been modified for potential cheating.

In further embodiments, a combination of head position and eyes tracking may be together monitored to detect possible cheating. For example, a user may attempt to see through a nose gap of a VR headset, such as to view a cheat sheet or unauthorized materials and tools, by tilting their head up while moving their eyes down to see outside the XR hardware. The detection software associated with the XR examination experience would use eye tracking camera and motion sensors, such as a gyroscope or similar 6-degrees of freedom sensors, to detect the combined head tilting upward and downward viewing direction of the eyes to notify one or both of the test giver and test taker of possible cheating being detected. It will be appreciated that users may look up while also tilting head up to think, but detection of eyes looking down while head is tilting while taking an XR examination suggests possible cheating.

In further embodiments, staring for an unexpected period of time in a direction other than where the examination questions and answers are displayed to the user is detected for possible cheating. Specifically, if a user during a XR examination is detected as staring downward (or other unexpected direction) for a time exceeding a predetermined threshold, such as 2 or more minutes (or other timeframe applicable to the corresponding question), without the user moving their eyes may mean the user is looking at a calculator, cheat sheet or other outside source, since users don't typically leave their eyes in one direction for prolonged times during an examination.

In other embodiments, a virtual examination tablet is configured for and provided to a test taker in the XR environment to take an XR examination. The virtual examination tablet is similar to a real world computing tablet device but as a virtual version of a tablet having particular tools enabled and other tools=restricted or non-enabled as applicable to the particular examination. Such enablement and restriction of tools on the virtual examination tablet may change during the examination, such as being specific to the question a user is answering or based on sections or timeframes associated with the examination. Examples of tools that might be enabled or restricted might include a user's notes, particular calculators or calculation functions, reference materials (e.g. maps, dictionaries, thesaurus, periodic table, equation list, and the like), textbooks (including specific pages), virtual writing instruments, and other specific files, media, and linked information (including websites).

In some embodiments, different VR tablets may be provided as different tools to users during an XR examination experience. In such embodiments, one VR tablet may include calculator(s), another tablet may include textbook pages or other reference materials, and so on. In further embodiments, a different VR tablet may also be provided for different subject matter of the examination. For example, an English examination tablet with predetermined tools may be provided for an English examination while a Mathematics examination tablet with applicable math tools may be provided for a Math Examination. It will be appreciated that such examination tablets help prevent cheating since access to permitted tools is controlled by a test giver.

In further embodiments, the interaction of test takers with tools, including VR tablets and tablet tools as described in the preceding disclosure, may be tracked on a question-by-question basis to determine whether certain users are interacting with tools for a questions in a different way and manner than the expected interactions of most users for a particular questions. As an example, an XR anti-cheating software may be provided in the XR platform to store and track the time that users spend on each question, how often a user is changing tools or not as compared to other students that are using tools, examination tablet, and the like. For example, for a particular question use of a VR calculator tool or math tablet may be determined as an average time of use for users. If a certain test taker is determined to have significantly less or more use of the calculator from tracking of the user's use of tools for that particular question as compared to the expected average usage that was determined, then cheating may be suspected and a notification may be provided to the test giver of possible cheating by that user with "outlier" tools' usage to the expectation for the question (or multiple questions if applicable). In particular embodiments where use of an XR tool is deemed necessary (or detected as being used by almost all test takers that answered a question correctly) by the test giver, if a particular user is detected to not even use the tool for correctly answering an applicable question, such as a complicated math question that requires a calculator, the anti-cheating software may provide notification of a strong likelihood of cheating on that question by that user.

Because XR platforms enable test givers to track and store where test takers' hands are continually positioned during an examination, what tools are being used and when (such as by question), what a user is pressing on VR calculator or tablet and when (such as by question), what a user is writing on the user's scratch paper and when (such as by question), embodiments of the invention include flagging the user's activities for post-examination review of the VR recording of the examination experience at such points (timestamps) of the recording that the user was engaged in particular activities. In embodiments, automated bookmarking may be used to identify different activities and movements of a user during the examination, including writing, calculating, tool use and the like, so that a test giver (or the test taker or a test monitor) can go back and what particular activities of interest at particular times during the test where cheating may have been flagged/provided notification during the examination.

In some embodiments, external cameras to the wearable XR hardware, such as integrated on a VR headset or outside cameras connected to the XR platform (e.g. webcams), may also monitor the user's external "real world" environment with timestamps correlated to an XR recording of the user's examination experience. During particular instances where possible cheating activity may be flagged, the external cameras may photograph, stream or record the external activity to the hardware and one or more individuals monitoring for cheating could watch such video or view images of the "real world" environment at particular times of interest to see whether a user was likely or not likely to be cheating during the capturing of the external environment.

In some embodiments for avoiding cheating in XR examinations, a user's hands and/or arms may be tracked for whether the same violated a defined boundary within which the same are supposed to be maintained. For example, a test giver may establish a stationary boundary that a test takers hands and arms should be kept within such boundary or a notification of possible cheating will be triggered if there is a detection that the boundary is violated. Such boundary could be standardized across all user with a predetermined distance from a user's head, chest or other detected body part, or could be customized for each user based on calibrating each user's reaching distance or similar parameters relevant to the user's positioning during XR examination.

In one embodiment, a user may be expected to keep their hands and/or arms visibly on or above a virtual or "real world" desk, table or work surface. If the antic-cheating software detects that the user breaches such position of the work surface or if the user's hands/arms disappear for a predetermined amount of time, then a notification may be generated of possible cheating occurring during the XR examination.

In various embodiments of the invention, when a user is detected to be potentially cheating and notification is sent to the test giver, proctor or test monitor, the monitoring individual (preferably with wearable XR hardware such as a VR headset) is able to join the test taker in real-time in the user's XR room or environment where that user is taking the examination. The monitoring individual could be invisible or could be visible depending on the notification settings desired by the test giver. In some instances, the software may announce to the test taker 'now you have a proctor' who (either as invisible or visible depending on the monitoring settings) is now watching that user. In alternative embodiments, the monitoring individual could join (either visible or invisible to the test taker) the XR examination through other computing devices and displays besides wearable XR hardware, such as web-connected browser or similar online network connection on a smart phone, tablet, computer and the like.

In other instances, the activities of the test giver that trigger notification of possible cheating may result in XR video recordings and/or external camera recordings of the user's real world environment to be sent directly to the test monitoring individual to review. It will be appreciated that the test monitoring review may occur in an XR platform or on other computing devices capable of presenting the video to the test giver or monitoring individual. Such video could be watched and controlled (such as moving or focusing on object and activities that were recorded) in an XR platform or on other computing device displays such as smart phone devices, tablets, laptops and other displays connected to computer hardware.

In other embodiments, while an individual is monitoring what test takers are doing, the test takers' scratch paper can be available on the XR platform or on the web or other computing devices to the remote proctor, preferably in "real time." In other embodiments, eye tracking data, calculator and other tools' usage data, hands movement data, files access, reference materials access, and the like is available to a proctor via XR hardware, such as a headset, or remotely via computing devices that connect to the web or otherwise to such data in the XR platform.

In certain embodiments, a proctor is able to see a plurality (or even all) of test takers' virtual scratch paper at the same time, such as on one big screen. In embodiments, the XR anti-cheating software processes the scratch papers inputs or streams or records the same for the plurality of users and renders each test taker's scratch paper at a particular moment to a display to the proctor. The simultaneous display of virtual scratch paper from each user enables the proctor to monitor in real-time whether certain test takers are potentially cheating by engaging in unexpected activity for answering an examination question. In some embodiment, artificial intelligence or computer-assisted analysis can be implemented to simultaneously monitor the scratch paper from the test takers' for any unexpected activity and notify a test taking monitor if there is potential cheating based on the unusual activity.

In some embodiments, post-examination cheating detection may be employed with respect to test takers of an XR examination rather than real-tim monitor through an instructor, proctor or other test giver watching one more XR recordings of users who took the test and verifying that each user legitimately determined answers for questions of the examination without cheating. Beyond conventional review of scratch paper in a VR environment as to how a test-taker "shows their work," a test giver can further view the following other characteristics and activities of the test taker during the examination: facial expressions, eye tracking hand movements, what and when writing on scratch paper occurred, what is typed in the calculator (and not just the final thing the user typed in, but every stroke), what tools are used and when and/or what the user said verbally and out loud during the examination, including a test taker's narration of a problem-solving activity if the instructor asked for test takers to narrate what each user does as the user is answering a question.

In further embodiments, a test giver can go back and view if test taker changed or hesitated as to an answer for a particular question on the XR examination. For example, students sometime mark C on a hard copy test marking answer sheet (e.g. Scantron) but erase it and then mark B. With VR viewing of one or more students that make such a change during an XR examination, an instructor can determine if an answer change raises a suspicion of cheating as to one or more students or was a legitimate change of answer.

Unlike merely grading an examination by conventional pen marking or basic electronic grading, the present invention enables an instructor to enter an XR recording of a student taking a test and the instructor is presented a display and controls to walk around the XR room and watch the test taker that previously took the exam and view the test taker's expressions, notes, eye tracking and the like to determine if cheating was likely.

In some embodiments, anti-cheating software of the invention is programmed to allow an instructor or other test giver to enable or disable for certain timeframes, such as until all other classes have completed an examination or homework, whether students can share recordings, notes, files, tools and the like with other students. Depending on when all students across all classes have completed the classwork or examination, the instructor may designate via an XR software application that presents the classwork or examination to student users if and when a student can share particular classwork or examination information.

In further embodiments of the invention, a "Exam Mode" can be included in education or examination application on an XR platform that allows certain functions to be turned "off" or otherwise restricted during an examination in the XR application. Other XR environment settings may also accompany the entry into "Exam Mode" on a wearable XR device, such as turning on all cameras, mcirpohones and all anti-cheating mechanisms. All anti-cheating monitoring and recording will also be initiated when "Exam Mode" is launched. Further, when Exam Mode is started, particular applications and functions of applications may be restricted such as background applications, games, browser functionality (including blocking or permitting particular websites during the examination), unauthorized tools, unauthorized VR tablets, file folders, files, documents and the like.

In embodiments, a test giver is provided an interface in an XR application or XR operating system controls to activate "Exam Mode" in real-time at beginning of an examination or scheduling Exam Mode to be active during a timeframe of the examination on user's wearable XR hardware, including a VR headset.

In one embodiment, when Exam Mode is initiated, each user's VR headset, or other XR hardware, determines and optionally sends its battery life to either confirm that sufficient battery power is present for the examination—the test taker cannot claim the battery died during the test and possible cheat during a claimed power deficiency—or to require that a test taker charges their battery to a sufficient level before beginning the test if too low of battery life is detected.

Various embodiments of the invention have been described. It will, however, be evident that various modifications and changes may be made thereto, and additional embodiments may be implemented, without departing from the broader scope of the invention as set forth in this disclosure. This specification is to be regarded in an illustrative rather than a restrictive sense.

What is claimed is:

1. A method to detect cheating on an examination in an extended reality environment comprising:
   displaying in the extended reality environment one or more examination questions to a user appearing in the extended reality environment, wherein the user is wearing user extended reality hardware in a real world environment;
   electronically and automatically detecting an activity displayed in the extended reality environment of the user during the examination that triggers an electronic notification of possible cheating by the user to an individual monitoring for cheating; and
   displaying the user as the user appears in the extended reality environment taking the examination in the extended reality environment to the individual monitoring for cheating on a display of computing hardware.

2. The method of claim 1, wherein the displaying the user taking the examination in the extended reality environment to the individual monitoring for cheating occurs as an extended reality video recording after the user has finished taking the examination.

3. The method of claim 2, further comprising displaying the video recording to the individual monitoring for cheating after receiving a bookmark retrieval request for the video recording.

4. The method of claim 1, wherein the displaying the user taking the examination in the extended reality environment to the individual monitoring for cheating occurs while the user is still taking the examination.

5. The method of claim 4, further comprising maintaining invisibility of the individual monitoring for cheating during displaying the user taking the examination in the extended reality environment to the individual monitoring for cheating.

6. The method of claim 4, further comprising making the individual monitoring for cheating visible to the user during displaying the user taking the examination in the extended reality environment to the individual monitoring for cheating.

7. The method of claim 6, wherein the display of computing hardware is a display of a second wearable extended reality hardware of the individual monitoring for cheating.

8. The method of claim 7, wherein the second wearable extended reality hardware is a virtual reality headset.

9. The method of claim 8, wherein the user wearable extended reality hardware is a virtual reality headset.

10. The method of claim 6, wherein the display of computing hardware is a display of a mobile computing device.

11. The method of claim 6, wherein the display of computing hardware is a computing device display connected to an online network.

12. The method of claim 6, further comprising notifying the user that the individual monitoring for cheating is watching the user taking the examination.

13. The method of claim 2, wherein the display of computing hardware is a display of a second wearable extended reality hardware of the individual monitoring for cheating.

14. The method of claim 13, wherein the second wearable extended reality hardware is a virtual reality headset.

15. The method of claim 14, wherein the user wearable extended reality hardware is a virtual reality headset.

16. The method of claim 13, wherein the display of computing hardware is a display of a mobile computing device.

17. The method of claim 13, wherein the display of computing hardware is a computing device display connected to an online network.

18. The method of claim 1, further comprising monitoring a plurality of other users simultaneously for cheating that are taking the same examination in an extended reality environment.

19. The method of claim 18, further comprising tracking and comparing usage of one or more extended reality tools used for the examination by the plurality of other users for at least one question of the examination and providing the notification of possible cheating when the user's individual usage of the one or more extended reality tools is different by a predetermined amount from an average usage of the one or more extended reality tools by the plurality of other users for the at least one question.

20. The method of claim 19, wherein the one or more extended reality tools are provided to the user and each of the plurality of other users for use from a respective virtual tablet displayed to the user and each of the plurality of other users during the examination in the extended reality environment.

\* \* \* \* \*